United States Patent [19]
Nakasa et al.

[11] Patent Number: 6,028,729
[45] Date of Patent: Feb. 22, 2000

[54] MAGNETIC HEAD WITH READ AND WRITE COILS AND A CIRCUIT FOR INTERRUPTING A MUTUAL INDUCTION OF THE COILS

[75] Inventors: Masayuki Nakasa, Sennan; Junji Takahata, Sakai; Toshihito Kido, Matsubara, all of Japan

[73] Assignee: Minolta Co., Ltd., Osaka, Japan

[21] Appl. No.: 08/801,391

[22] Filed: Feb. 20, 1997

[30] Foreign Application Priority Data

Feb. 21, 1996 [JP] Japan ................................ 8-034032

[51] Int. Cl.[7] .......................... G11B 15/12; G03B 17/24
[52] U.S. Cl. ............................... 360/62; 360/3; 396/319
[58] Field of Search .............................. 360/3, 4, 25, 27, 360/61, 62, 67, 68, 123, 125; 396/319, 320

[56] References Cited

U.S. PATENT DOCUMENTS 5,416,454   5/1995   Izukawa ................................ 354/105

FOREIGN PATENT DOCUMENTS 0 433 019   6/1991   European Pat. Off. .

*Primary Examiner*—Paul W. Huber
*Attorney, Agent, or Firm*—McDermott, Will & Emery

[57] ABSTRACT

An apparatus provided with a magnetic head including a core, a writing coil and a reading coil wound around the core; a writing circuit connected with the writing coil for driving the writing coil; a reading circuit connected with the reading coil for generating a read signal based on an output of the reading coil; a power source for supplying an electric power to the writing circuit; and a controller for suspending the supply of electric power to the writing circuit when the reading circuit is in operation.

16 Claims, 14 Drawing Sheets

MAGNETIC HEAD WITH READ AND WRITE COILS AND A CIRCUIT FOR INTERRUPTING A MUTUAL INDUCTION OF THE COILS

BACKGROUND OF THE INVENTION

This invention relates to an apparatus provided with a magnetic recording and reproducing device capable of writing and reading information in and from a magnetic recording medium such as a magnetic tape by a magnetic head in which a write core and a read core are wound around a single core.

In recent years, the standardization of a novel photographing system has been promoted. In a film used for this novel photographing system, strip-like magnetic recording tracks (hereinafter, referred to as "magnetic recording portion") are provided in parallel to the exposure areas of the respective frames at one side along the length of the film. Pieces of information concerning the photographing such as a date of photographing and an exposure value (hereinafter, "film photographing information") are magnetically recorded in the magnetic recording portions in correspondence with the frames.

In the film used for the novel photographing system, a light blocking lid is provided at a film outlet of a film cartridge as disclosed in, e.g., U.S. Pat. No. 5,347,334 and the film is completely contained in the film cartridge. Further, a bar code plate by which the state of the contained film (an unexposed film, an exposed film, a film which is exposed halfway (hereinafter, "a partly exposed film), a developed film, etc.) is detectable is integrally rotatably provided at one end of a spool. The state of the film can be distinguished by reading a bar code on the bar code plate. Accordingly, even if the partly exposed film is rewound into the film cartridge and taken out of the camera, it can be loaded in the camera again to record images in unexposed frames. Further, a developed film can be stored by being contained in the film cartridge.

As described above, with the novel photographic system, a partly exposed film can be loaded in the camera and exposures can be made to unexposed frames. In order to realize such a function, there has been proposed a camera provided with a frame judging function: a signal is detected by scanning each magnetic recording portion of the loaded film by a magnetic head and whether or not the frame corresponding to the magnetic recording portion is exposed is judged based on whether or not the detection signal is a magnetic signal. As a magnetic recording and reading device of this camera, a magnetic head of core share type in which a write coil and a read coil are wound around a single core is used.

FIG. 18 is a circuit construction diagram of writing and reading portions arranged in the vicinity of a magnetic head in a prior art magnetic recording and reproducing device.

In FIG. 18, a magnetic head 100 is of core share type in which a ring shaped core 102 is formed with a gap 101 and a write coil 103 and a read coil 104 are wound around the ring-shaped core 102 at the opposite sides of the gap 101. The write coil 103 is connected with a writing portion 105, whereas the read coil 104 is connected with a reading portion 106. In the position of the gap 101, a magnetic recording medium 109 to the surface thereof magnetic substance is applied such as a magnetic tape and a magnetic film is relatively movably arranged.

The writing portion 105 has input terminals a, b. The input terminal a is connected with transistors Tr3, Tr4 and a resistor R10 via a resistor R12, whereas the input terminal b is connected with transistors Tr5, Tr6 and a resistor R11 via a resistor R13. Between a power source Eg and the collector of the transistor Tr3, a series circuit constructed by resistors R2, R3 and a transistor Tr1 having its base connected with a midpoint of the resistors R4, R5 are connected in parallel. Between the power source Eg and the collector of the transistor Tr5, a series circuit constructed by resistors R4, R5 and a transistor Tr2 having its base connected with a midpoint of the resistors R2, R3 are connected in parallel. A series circuit constructed by a resistor R1 and the write coil 103 is connected between the collectors of the transistors Tr3, Tr5.

In the above construction, when a high signal is input to the input terminal a (or a low signal is input to the input terminal b), a constant current I1 flows into a ground (GND) from the power source Eg via the transistor Tr2, the write coil 103, the resistor R1, the transistor Tr3 and the resistor R10. Conversely, when a high signal is input to the input terminal b (or a low signal is input to the input terminal a), a constant current I2 flows into the ground (GND) from the power source Eg via the transistor Tr1, the resistor R1, the write coil 103, the transistor Tr5 and the resistor R11. By generating magnetic fluxes in opposite directions at the gap 101, each magnetic data can be magnetized (written) in the magnetic recording medium 109 in a direction corresponding to the direction of the magnetic flux.

In the reading portion 106, a series circuit constructed by resistors R8, R6 and a series circuit constructed by resistors R9, R7 are connected between a bias power source Ed and a ground (GND), and the midpoints of the respective series circuits are connected with the read coil 104 and an amplifier AMP for reproduction. An ac signal detected by the read coil 104 is output to the amplifier AMP after being superimposed on a bias voltage, and is extracted after being amplified by the amplifier AMP.

In the case that the magnetic head 100 of core share type is used, the write coil 103 and the read coil 104 are magnetically connected by the ring-shaped core 102. A current flow in one coil generates an induction voltage in the other coil.

While the information is read, the transistors Tr1 to Tr6 of the writing portion 105 are turned off, and an impedance at a writing side becomes high. However, a small amount of leakage current is present in the write coil 103. Even if only a very small amount of current flows in the write coil 103, the induction voltage generated due to the mutual induction action is not completely negligible since the gain of the amplifier AMP of the reading portion 106 is set considerably high in view of the instability of the magnetic signal level. Particularly in the case that the level of the magnetic signal is approximately as low as a noise level, the noise coming from the write coil 103 by the mutual induction action makes it difficult to accurately detect the magnetic signal. Especially in the case that the frame judgment is made based on the magnetic signal, the judgment result is considerably reduced.

SUMMARY OF THE INVENTION

It is an object of the present invention to provide an apparatus provided with a magnetic recording and reproducing device which has overcome the problems residing in the prior art.

It is another object of the present invention to provide an apparatus provided with a magnetic recording and reproducing device which can ensure a high accuracy in reading magnetic information by securely preventing a noise voltage.

According to an aspect of the present invention, an apparatus comprises: a magnetic head including a core, a writing coil wound around the core, and a reading coil wound around the core; a writing circuit connected with the writing coil for driving the writing coil; a reading circuit connected with the reading coil for generating a read signal based on an output of the reading coil; a power source for supplying an electric power to the writing circuit; and a controller for suspending the supply of electric power to the writing circuit when the reading circuit is in operation.

The writing circuit and the reading circuit may be adapted for writing and reading information on a magnetic recording portion provided on a photographic film. The apparatus may be a camera.

The apparatus may be further provided with a judger for judging based on a read signal of the reading circuit whether the magnetic recording portion has been written with information.

According to another aspect of the present invention, an apparatus comprises: a magnetic head including a core, a writing coil wound around the core, and a reading coil wound around the core; a writing circuit connected with the writing coil for driving the writing coil; a reading circuit connected with the reading coil for generating a read signal based on an output of the reading coil; and a controller for disabling the writing circuit when the reading circuit is in operation.

According to still another aspect of the present invention, a method for writing and reading information on a magnetic recording medium by use of a magnetic head including a core, a writing coil and a reading coil wound around the core, the method comprises steps of: feeding the magnetic recording medium; suspending supply of electric power to the writing circuit; generating a read signal based on an output of the reading coil; and permitting supply of electric power to the writing circuit.

Further, there may be provided a step of permitting the writing coil to write information on the magnetic recording medium after permitting supply of electric power to the writing circuit.

According to yet still another aspect of the present invention, a method for writing and reading information on a magnetic recording portion of a photographic film by use of a magnetic head including a core, a writing coil and a reading coil wound around the core, the method comprises steps of: feeding the photographic film; suspending supply of electric power to the writing circuit; generating a read signal based on an output of the reading coil; and permitting supply of electric power to the writing circuit.

It may be appreciated to further provide a step of judging based on a read signal whether the magnetic recording portion has been written with information. Further, there may be provided a step of stopping the feeding of the photographic film when the magnetic recording portion is judged to have been written with no information. Furthermore, there may be provided a step of permitting the writing coil to write information on the magnetic recording portion after the photographic film is stopped.

These and other objects, features and advantages of the present invention will become more apparent upon a reading of the following detailed description and accompanying drawings.

DETAILED DESCRIPTION OF THE
PREFERRED EMBODIMENT OF THE
INVENTION

Figure 1:
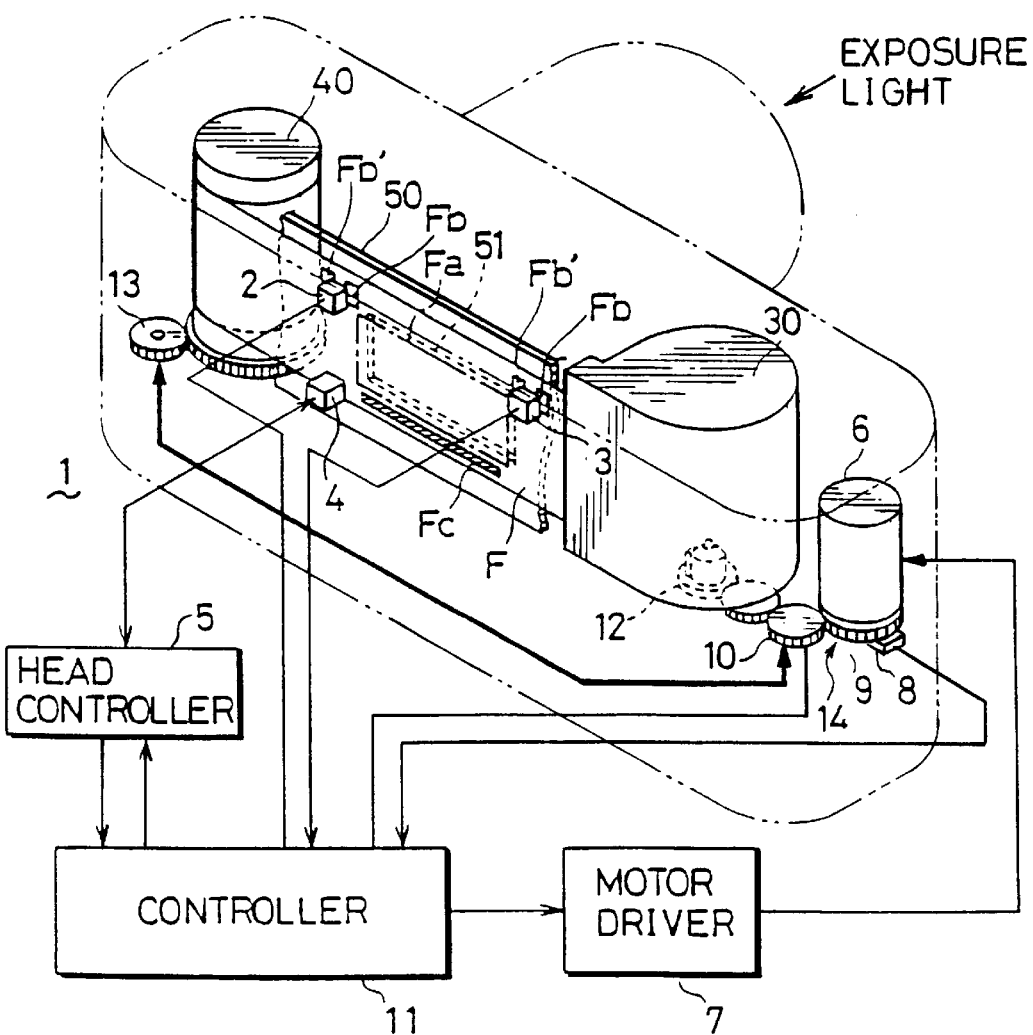
FIG. 1 is a schematic construction diagram of a camera carrying a magnetic recording and reproducing device as an embodiment of the present invention.

FIG. 1 is a schematic construction diagram of a camera embodying the present invention. A camera 1 carries a magnetic recording and reproducing device. Identified by 30 is a film cartridge loaded in a cartridge chamber provided at one end portion of a camera main body, by 40 a take-up spool rotatably provided in a film take-up chamber at the other end portion of the camera main body, and by 50 an exposure frame provided between the cartridge chamber and the film take-up chamber and behind a taking lens. The exposure frame 50 acts as a guide plate for feeding a film F pulled out of the film cartridge 30 to the film take-up chamber and is provided in its substantially center portion with a rectangular exposure aperture 51 of specified size (e.g., about 17 mm (height)×about 30 mm (width)) so as to restrict a projection of an object image to the film F.

The film F includes a plurality of frames Fa along its length and are formed along one edge portion (upper edge portion in FIG. 1) with pairs of perforations Fb, Fb' indicative of exposure areas of the frames Fa in correspondence with the frames Fa. The perforations Fb, Fb' indicate front and rear end positions of the corresponding frame Fa with respect to a film winding direction, respectively, and are formed in specified positions at the opposite ends of each frame Fa.

Strip-like magnetic recording portions Fc having a specified length L (e.g. 22 mm) are provided in correspondence with the respective frames Fa along the other edge portion (lower edge portion in FIG. 1) of the film F. Each magnetic recording portion Fc is adapted to magnetically record a film photographing information (including photographing conditions such as a date of photographing, an exposure value and an exposure correction, a framing information, and a print size information (standard/panorama)) concerning the photographing of the corresponding frame Fa.

The film photographing information is written in the magnetic recording portion Fc by a magnetic head 4 to be described later during film winding after an image is recorded in the corresponding frame Fa.

The respective pieces of information constituting the film photographing information are expressed in binary data including specified number of digits. Data of "0" and "1" constituting this binary data are written in the magnetic recording portion Fc in the form of a bit signal Pb having a waveform as shown in FIG. 3.

Figure 3:
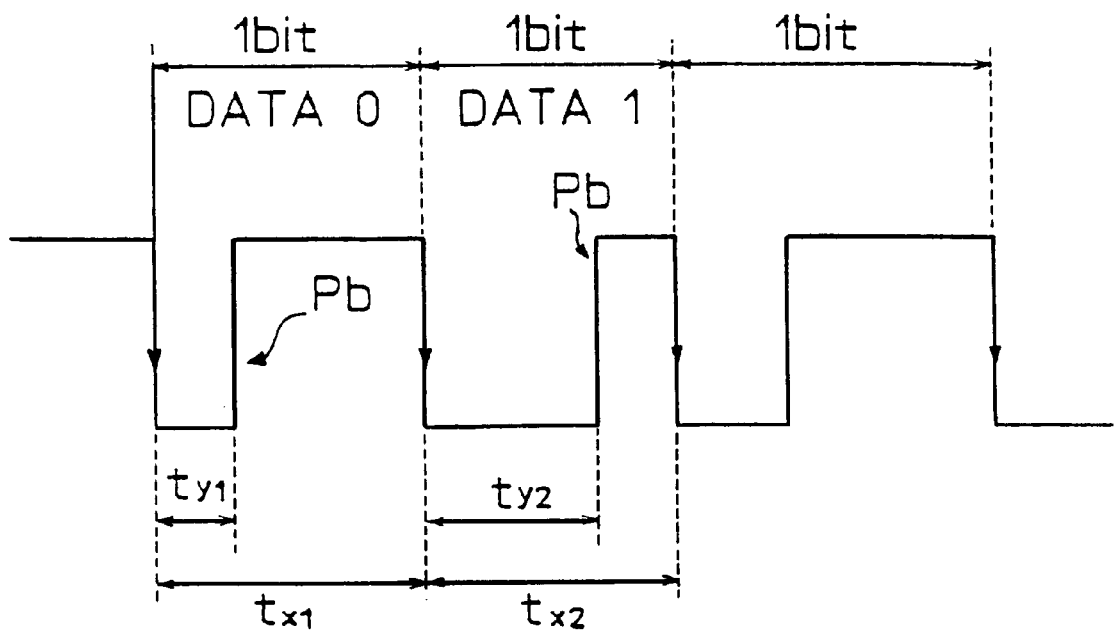
FIG. 3 is a diagram showing an exemplary waveform of a bit signal Pb representing film photographing information.

The bit signal Pb shown in FIG. 3 is such that two kinds of pulse signals having different duty ratios ($t_y/t_x$) are allotted to the data "0" and "1". Although a cycle $t_x$ of the bit signal Pb changes depending on a feeding speed v of the film F, since the duty ratios do not change, the content, i.e. "0" or "1" of each bit signal Pb can be judged based on its duty ratio.

A signal representing the film photographing information (hereinafter, "Ix-signal") which is to be written in the magnetic recording portion Fc is specified to consist of at least 248 bits. Since the length of the magnetic recording portion is 22 mm, a minimum bit density Db is 11.3 bits/mm (=248 bits/22 mm). Any writing condition which satisfies the above writing condition can be selectively set in the camera.

The feeding speed v of the film F when the film photographing information is written is set in a range of, e.g. 50 mm/s to 200 mm/s. A minimum frequency $f_{MIN}$ of the Ix-signal picked up from the magnetic recording portion Fc is set at 563.6 Hz (=50 mm/s×11.3 bits/mm).

Referring back to FIG. 1, the frame judging device includes photointerrupters 2, 3 for detecting the perforations Fb, Fb', a magnetic head 4 for writing and reading the film information in and from the magnetic recording portion Fc, a head controller 5 for controlling the driving of the magnetic head 4, a motor 6 as a drive source for feeding the film F, a motor driver 7 for controlling the driving of the motor 6, a pulse plate 8 and a photoreflector 9 for monitoring a rotation amount of the motor 6, a torque transmission mechanism 10, and a controller 11. The torque transmission mechanism 10 switchingly transmits a torque of the motor 6 to a driving axis 12 fitted into the spool of the film cartridge 30 and a drive gear 13 of the take-up spool 40. The controller 11 controls the driving of each element to write and read the film photographing information and to make a judgment for each frame.

The photointerrupter 2 (hereinafter, "PI 2") is arranged in a position in the vicinity of an upper corner portion of the exposure aperture 51 at the side to the take-up spool 40 where it faces a movement path of the perforations Fb, Fb'. The photointerrupter 3 (hereinafter, "PI 3") is arranged in a position in the vicinity of an upper corner portion of the exposure aperture 51 at the side to the cartridge chamber where it faces the movement path of the perforations Fb, Fb'.

Figure 2:
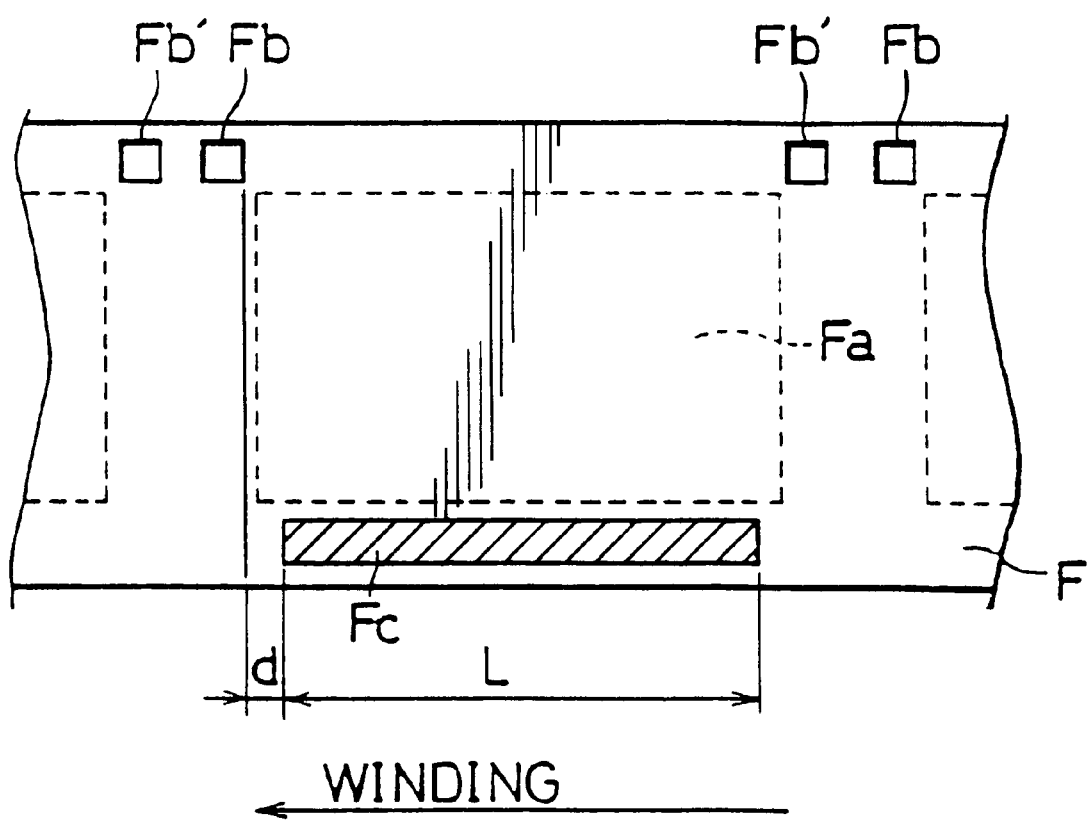
FIG. 2 is a diagram showing a magnetic recording portion provided in a film.

The PI 2 is adapted to position the exposure area of each frame Fa with respect to the exposure aperture 51 and to detect start timings of the writing and reading of the film photographing information in and from the magnetic recording portion Fc of each frame. More specifically, when the film F is fed until the perforation Fb is detected by the PI 2, the exposure area of this frame Fa coincides with the exposure aperture 51. Further, the front end position of the magnetic recording portion Fc is displaced from the perforation Fb by a specified distance d as shown in FIG. 2. The writing and reading of the film photographing information in and from the magnetic recording portion Fc are performed by controlling the driving of the magnetic head 4 upon feeding the film F by the distance d from the detection position of the perforation Fb by the PI 2. The PI 2 detects the perforations Fb, Fb' based on a change in the detection signal resulting from the fact that the interruption of a light path is released by the holes.

The PI 3 detects the leading end of the film F coming out of the film outlet of the film cartridge 30. The PI 3 detects the leading end of the film F based on a change in the detection signal resulting from the fact that a light path is interrupted by the film F. The detection signals of the PIs 2 and 3 are input to the controller 11.

The leading end of the film F is detected by the PI 3 to securely detect a noise signal by the magnetic head 4 and to set judgment threshold values when judging based on the presence or absence of the Ix-signal whether each frame is exposed or unexposed during the loading of the film F. More specifically, when the magnetic head 4 is driven upon the detection of the leading end of the film F by the PI 3, the film F has not yet reached the magnetic head 4. Accordingly, a signal (noise signal) in an area other than the magnetic recording portions Fc can securely be detected. The setting of the judgment threshold value is described in detail later.

Figure 4:
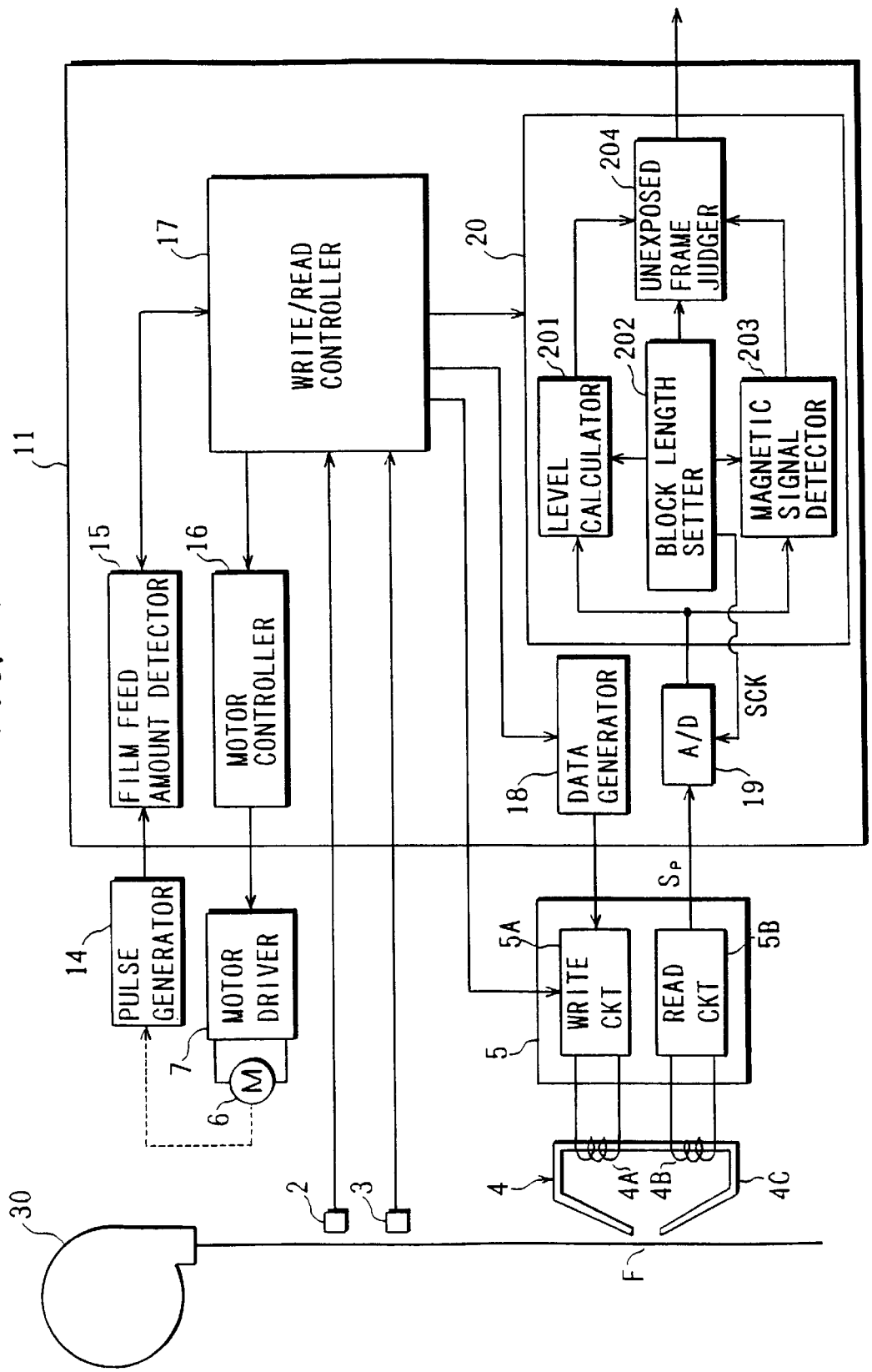
FIG. 4 is a block diagram of a control system of the film frame judging device.

In order to have a small size, the magnetic head 4 is constructed by a head of core sharing type in which a write coil 4A and a read coil 4B are wound around a single ring-shaped core 4C (see FIG. 4). The head controller 5 includes a magnetic signal writing circuit 5A connected with the write coil 4A and a magnetic signal reading circuit 5B connected with the read coil 4B (see FIG. 4).

The magnetic signal writing circuit 5A converts a direct current into an alternating current based on the Ix-signal (bit signal Pb) which represents the film photographing information and is output from the controller 11 and supplies the obtained alternating current to the write coil 4A. When the alternating current flows in the write coil 4A, a fluctuating magnetic field corresponding to the magnetic signal is generated at a gap of the magnetic head 4. The film photographing information is recorded by magnetizing the magnetic recording portion Fc by this fluctuating magnetic field.

The magnetic signal reading circuit 5B is mainly constructed by an amplifier and is adapted to amplify the signal detected by the magnetic head 4 by superimposing it on a specified dc bias level and to output the amplified signal. Specifically, the circuit 5B has an output voltage range of, e.g. 0 to 5 V, and amplifies and outputs the signal detected by the magnetic head 4 into a signal having 2.5 V as a center point and an amplitude of 2.5 V or smaller.

The motor 6 includes an electric motor such as a stepping motor. The motor driver 9 generates a control signal (e.g. a pulse train signal) to the motor 6 and outputs it to the motor 6 so as to control the rotating speed, rotation amount, activation/deactivation and the like of the motor 6.

The pulse plate 8 and the photoreflector 9 construct a pulse generator 14 (see FIG. 4) for generating a pulse train signal to detect the rotation amount, the rotating speed and the like of the motor 6. The pulse plate 8 is a disk formed at its periphery with strips or grooves having a shape of gear teeth which are circumferentially arranged at specified intervals. By detecting the stripes or grooves by the photoreflector 9, a pulse train signal of a cycle corresponding to the rotating speed of the pulse plate 8 is generated. This pulse train signal is output to the controller 11.

The torque transmission mechanism 10 includes a speed reducing/drive transmitting portion constructed by a combination of planetary gear devices and a drive direction switching portion for switching the connection of gear trains by a cam, and switches the transmission direction of the torque of the motor 6 by switching the position of the cam. The camera is provided with three torque transmission modes: a wind mode, a rewind mode and a thrust mode. In the wind mode, the torque of the motor 6 is transmitted to the drive gear 13 via the torque transmission mechanism 10, with the result that the film F is fed in the winding direction by the rotation of the take-up spool 40.

In the rewind mode, the torque of the motor 6 is transmitted to the fork 12 and the spool to which the fork 12 is fitted via the torque transmission mechanism 10, with the result that the film F is fed in the rewinding direction by the rotation of the spool of the film cartridge 30. The thrust mode is a drive mode for the film loading. In this mode, the torque of the motor 6 is transmitted to the fork 12 and the drive gear 13 via the torque transmission mechanism 10, with the result that the film F is thrusted out of the film cartridge 30 by the rotation of the spool of the film cartridge 30. After the film F is nipped by the take-up spool 40, the film F is fed in the winding direction until the exposure area of the leading frame Fa reaches the exposure aperture 51 by the rotation of the spool and the take-up spool 40.

Figure 5:
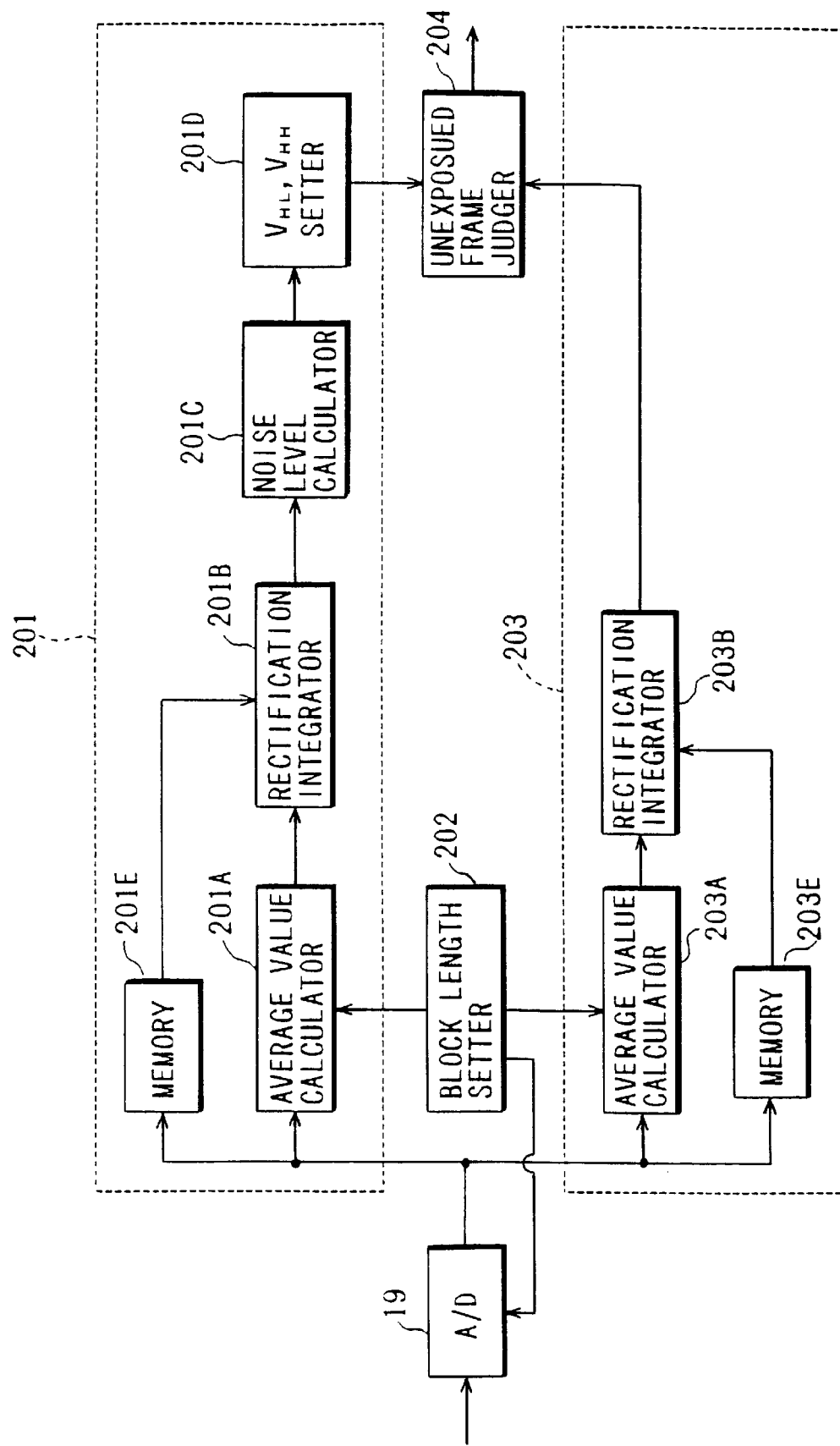
FIG. 5 is a block diagram showing an internal construction of a frame judger.

FIG. 4 is a block diagram of a control system of the film frame judging device 1, and FIG. 5 is a block diagram showing the internal construction of a frame judger. In FIG. 4, the same elements as those shown in FIG. 1 are identified by the same reference numerals.

The controller 11 is provided with a film feed amount detector 15, a motor controller 16, a write/read controller 17, a write data generator 18, an analog-to-digital (A/D) converter 19 and a frame judger 20.

The film feed amount detector 15 detects the feeding speed and the feed amount of the film F based on the pulse train signal input from the pulse generator 14. Specifically, the detector 15 detects a pulse duration $\tau$ (sec.) of the pulse train signal, and calculates the feeding speed v from this pulse duration $\tau$ and a pulse number $N_P$ per rotation of the motor 6. Assuming that the film F is fed by S (mm) by one turn of the motor 6, the feeding speed v is calculated by $S/(\tau \times N_P)$. The detector 15 also calculates the feed amount D of the film F by adding a pulse number N. The feed amount D is calculated by $N \cdot S/N_P$. The detection data of the detector 15 are input to the write/read controller 17.

The motor controller 16 controls the drive and the driving direction of the motor 6. The motor controller 16 outputs a drive control signal to the motor driver 7 in accordance with a control signal from the write/read controller 17.

The write/read controller 17 controls the writing and reading of the film photographing information. The write/read controller 17 controls the feed of the film F via the motor controller 16 so as to relatively move the magnetic head 4 with respect to the film F, that is, so as to scan the film F. Further, as described later, during the film loading, the write/read controller 17 controls the drive of the frame judger 20 to cause it to make a judgment for each frame (whether or not the frame is unexposed) based on the signal detected from the magnetic recording portion Fc.

Figure 6:
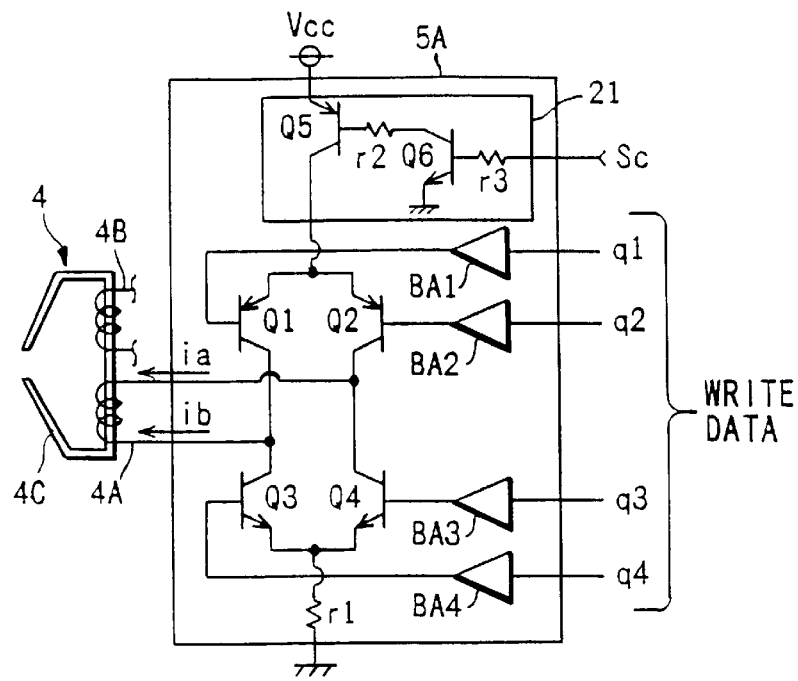
FIG. 6 is a diagram showing one exemplary circuit construction of a magnetic signal writing circuit.

The write data generator 18 generates a write data used to drive the magnetic head 4 based on the film photographing information represented by the bit signal Pb. The magnetic signal writing circuit 5A is constructed by an inverter circuit including four switching devices Q1 to Q4 as shown in FIG. 6. In this embodiment, the switching devices Q1, Q2 are pnp-type transistors, whereas the switching devices Q3, Q4 are npn-type transistors.

A series circuit formed by the transistors Q1, Q3 and a series circuit formed by the transistors Q2, Q4 are connected in parallel, and the write coil 4A is connected between a point of connection between the transistors Q1 and Q3 and a point of connection between the transistors Q2 and Q4. Further, the emitters of the transistors Q3, Q4 are grounded via a resistor r1, whereas the emitters of the transistors Q1, Q2 are connected with a dc power source Vcc via a switching circuit 21 constructed by switching devices Q5 and Q6.

The switching circuit 21 is adapted to completely interrupt a dc supply path from the dc power source Vcc to the magnetic signal writing circuit 5A when the magnetic head 4 is used as a reading head, thereby preventing a mutual induction action of the write coil 4A and the read coil 4B. The switching devices Q5, Q6 are a pnp-type transistor and an npn-type transistor, respectively. The emitter of the transistor Q5 is connected with the dc power source Vcc, and the connector thereof is connected with the emitters of the transistors Q1, Q2. The collector of the transistor Q6 is connected with the base of the transistor Q5 via a resistor r2, and the emitter thereof is grounded. To the base of the transistor Q6 is input a control signal $S_C$ for turning the transistor Q6 on and off via a resistor r3. The control signal $S_C$ is input to the magnetic signal writing circuit 5A from the write/read controller 17.

Upon the receipt of the control signal $S_C$ of high level, the transistor Q6 is turned on, and the base of the transistor Q5 becomes low level, thereby turning on the transistor Q5 (conductive state). On the other hand, upon the receipt of the control signal $S_C$ of low level, the transistor Q6 is turned off, and the base of the transistor Q5 becomes high level, thereby turning off the transistor Q5 (nonconductive state).

Figure 7:
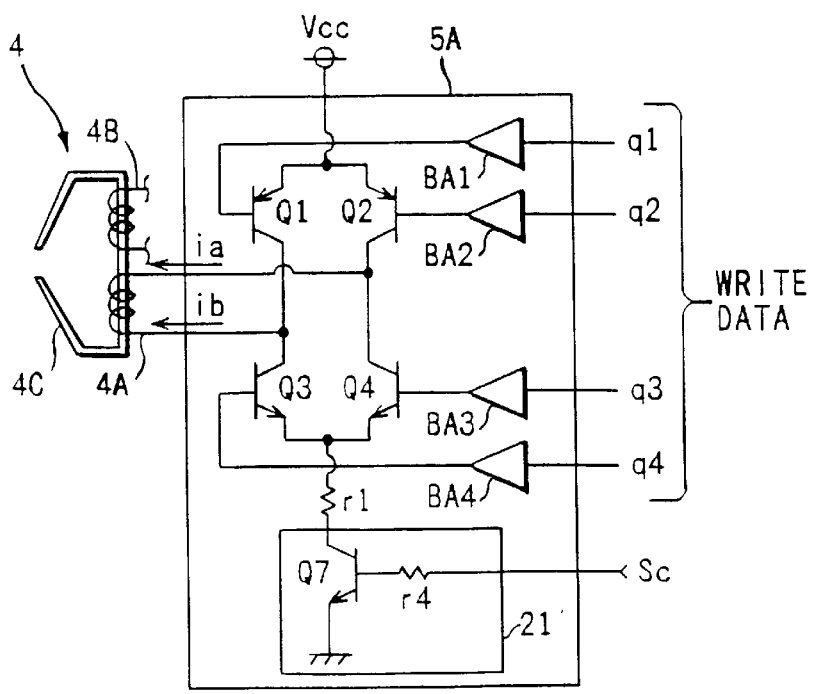
FIG. 7 is a diagram showing another exemplary circuit construction of the magnetic signal writing circuit.

Although the switching circuit 21 is provided between the dc power source Vcc and the transistors Q1, Q2 in FIG. 6, a switching circuit 21' may be provided between the resistor r1 and the ground as shown in FIG. 7. In FIG. 7, the switching circuit 21' is constructed by an npn-type transistor Q7, and the control signal $S_C$ is input to the base of the transistor Q7 via a resistor r4. In this case as well, upon the receipt of the control signal $S_C$ of high level, the transistor Q7 is turned on (conductive state). Upon the receipt of the control signal $S_C$ of low level, the transistor Q7 is turned off (nonconductive state).

The write data is input to the bases of the transistors Q1 to Q4 via buffer amplifiers BA1 to BA4. The transistors Q1, Q2 are turned on upon the receipt of a low level signal, whereas the transistors Q3, Q4 are turned on upon the receipt of a high level signal. Accordingly, if the write data is a 4-bit data (q1, q2, q3, q4) and "1" and "0" denote a high level signal and a low level signal, respectively, a write data (1, 1, 0, 0) is output from the write data generator 18 when the writing is not performed. Further, when the film photographing information is to be written, a write data (1, 0, 1, 0) is output from the write data generator 18 if there is a current ia flowing downward of the write coil 4A in FIG. 6. Conversely, a write data (0, 1, 0, 1) is output from the write data generator 18 if there is a current ib (=−ia) flowing upward of the write coil 4A in FIG. 6.

The write data generator 18 outputs the write data to the magnetic signal writing circuit 5A at a specified timing when the information is to be written in accordance with the control signal from the write/read controller 17.

The A/D converter 19 converts an analog signal $S_P$ input from the magnetic signal reading circuit 5B into a digital signal $S_P$. In this embodiment, the A/D converter 19 converts the analog signal $S_P$ into a 8-bit digital data. Specifically, the A/D converter 19 applies a sampling to the signal $S_P$ in a specified cycle in accordance with a sampling clock SCK input from a block length setting portion 202; converts the level of each sampling signal from an analog value into a digital value; and outputs the thus obtained digital data to the frame judger 20 and an unillustrated information decoder for decoding the film photographing information from the magnetic signal.

The frame judger 20 judges based on the level of the signal $S_P$ detected from the magnetic recording portion Fc whether the signal $S_P$ is an Ix-signal, and also judges based on the above judgment result whether the frame Fa corresponding to the magnetic recording portion Fc is unexposed or not.

The frame judger 20 includes a threshold level calculator 201, the block length setting portion 202, a magnetic signal detector 203 and an unexposed frame judger 204.

The threshold level calculator 201 calculates threshold levels $V_{HL}$, $V_{HH}$ used to judge whether the signal $S_P$ detected in the magnetic recording portion Fc is an Ix-signal based on a signal $S_P'$ detected when the magnetic head 4 is located in a position outside the magnetic recording portion Fc (i.e. noise signal $S_P'$). The threshold level $V_{HL}$ is a level used to judge whether the signal $S_P$ is a noise signal, whereas the threshold level $V_{HH}$ ($>V_{HL}$) is a level used to judge whether the signal $S_P$ is an Ix-signal. The data on the threshold levels $V_{HL}$, $V_{HH}$ are output to the unexposed frame judger 204.

The threshold level calculator 201 includes, as shown in FIG. 5, an average value calculator 201A, a rectification integrator 201B, a noise level calculator 201C, a threshold level setting portion 201D, and a memory 201E. As described later, the frame judgment is made by dividing the magnetic recording portion Fc into a plurality of blocks and generating a judgment signal based on the signal $S_P$ detected block by block. The memory 201E is adapted to store the digital signal $S_{P'}$ input from the A/D converter 19 for each block length. The average value calculator 201A calculates an average level $V_{NAVE}$ of the digital signal $S_{P'}$, for each block. The rectification integrator 201B applies a full wave rectification to the digital signal $S_{P'}$ on the basis of the average level $V_{NAVE}$, and integrates this rectification signal. The noise level calculator 201C calculates a noise level K by averaging integral values $S_N$ calculated for a plurality of blocks ($=\Sigma S_N/n$: n=the number of blocks).

Figure 8:
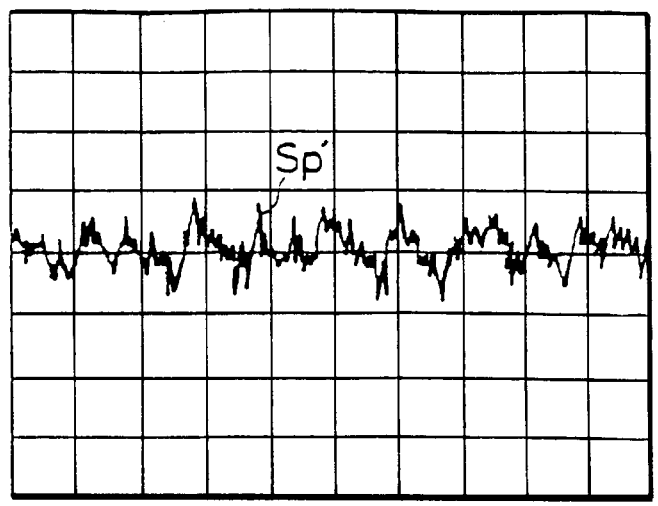
FIG. 8 is a waveform chart showing an exemplary noise detection signal.
Figure 9:
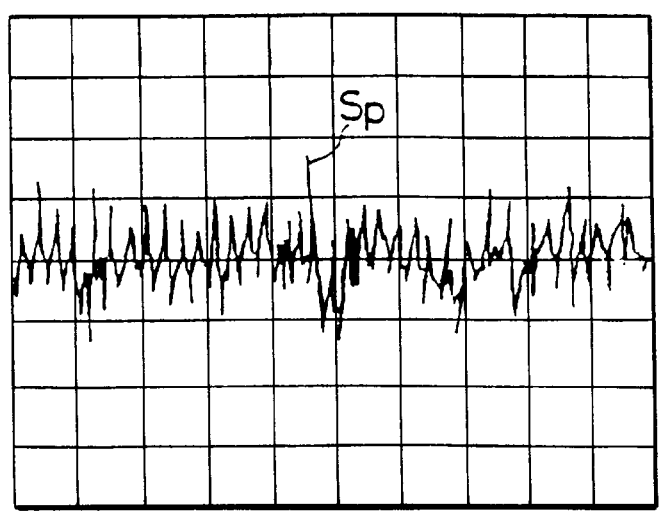
FIG. 9 is a waveform chart showing an exemplary detecting signal when a magnetic signal having a low level is detected.
Figure 10:
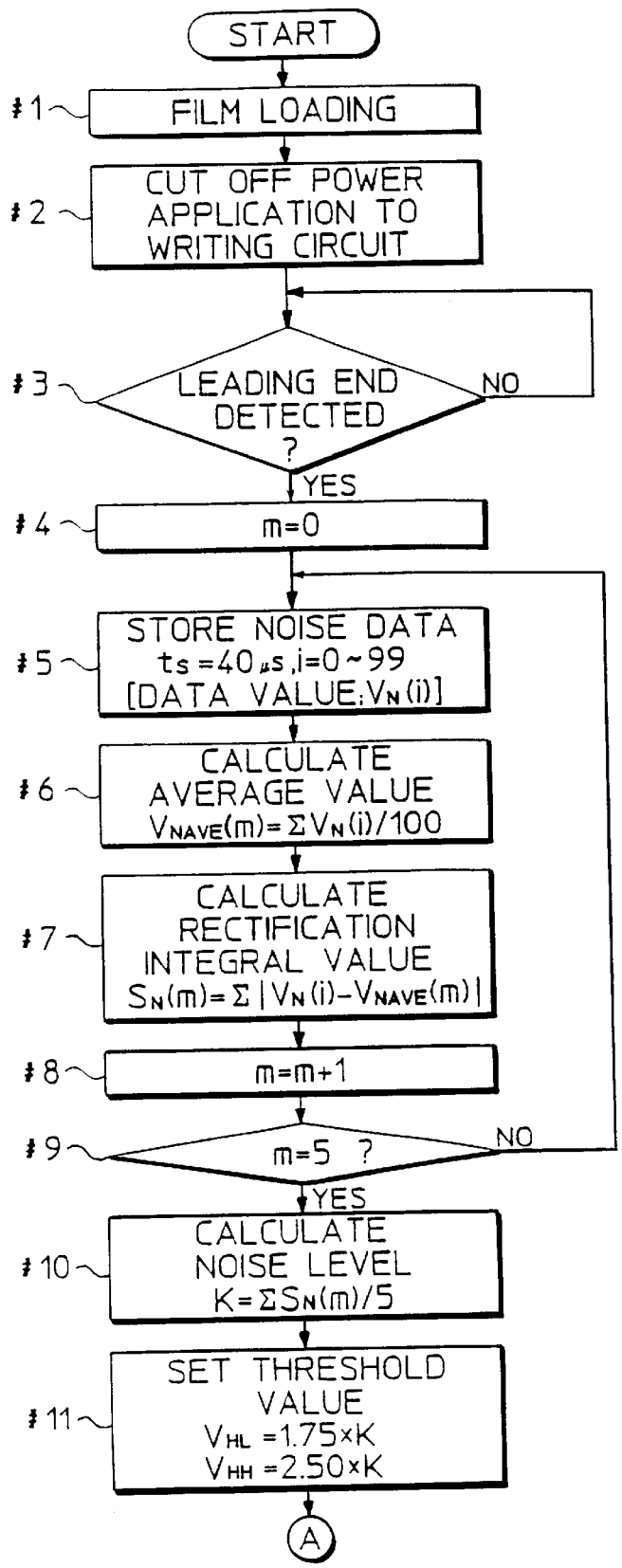
FIGS. 10 to 13 are a flowchart showing a control sequence of a film frame judgment processing.
Figure 11:
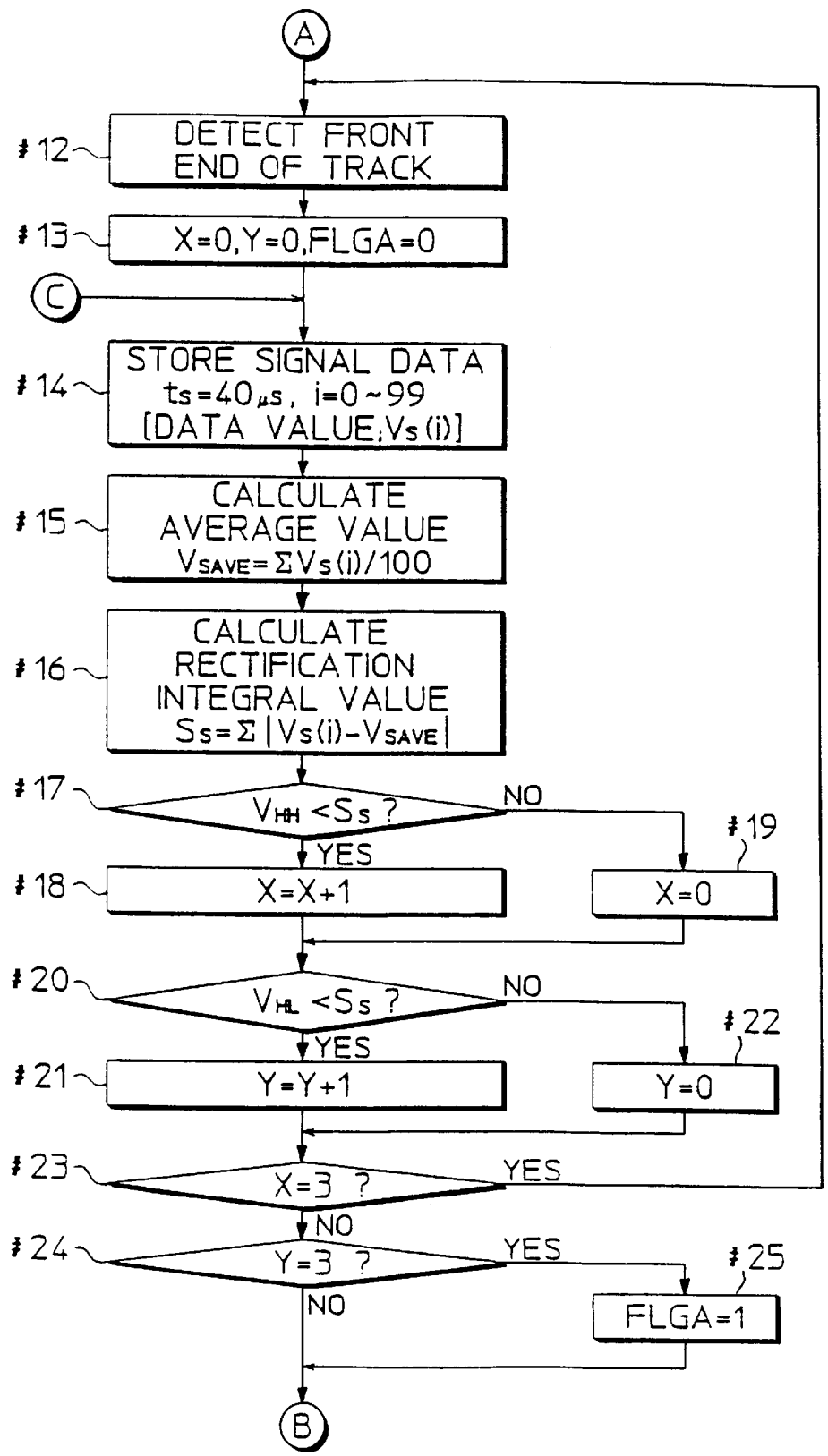
Figure 12:
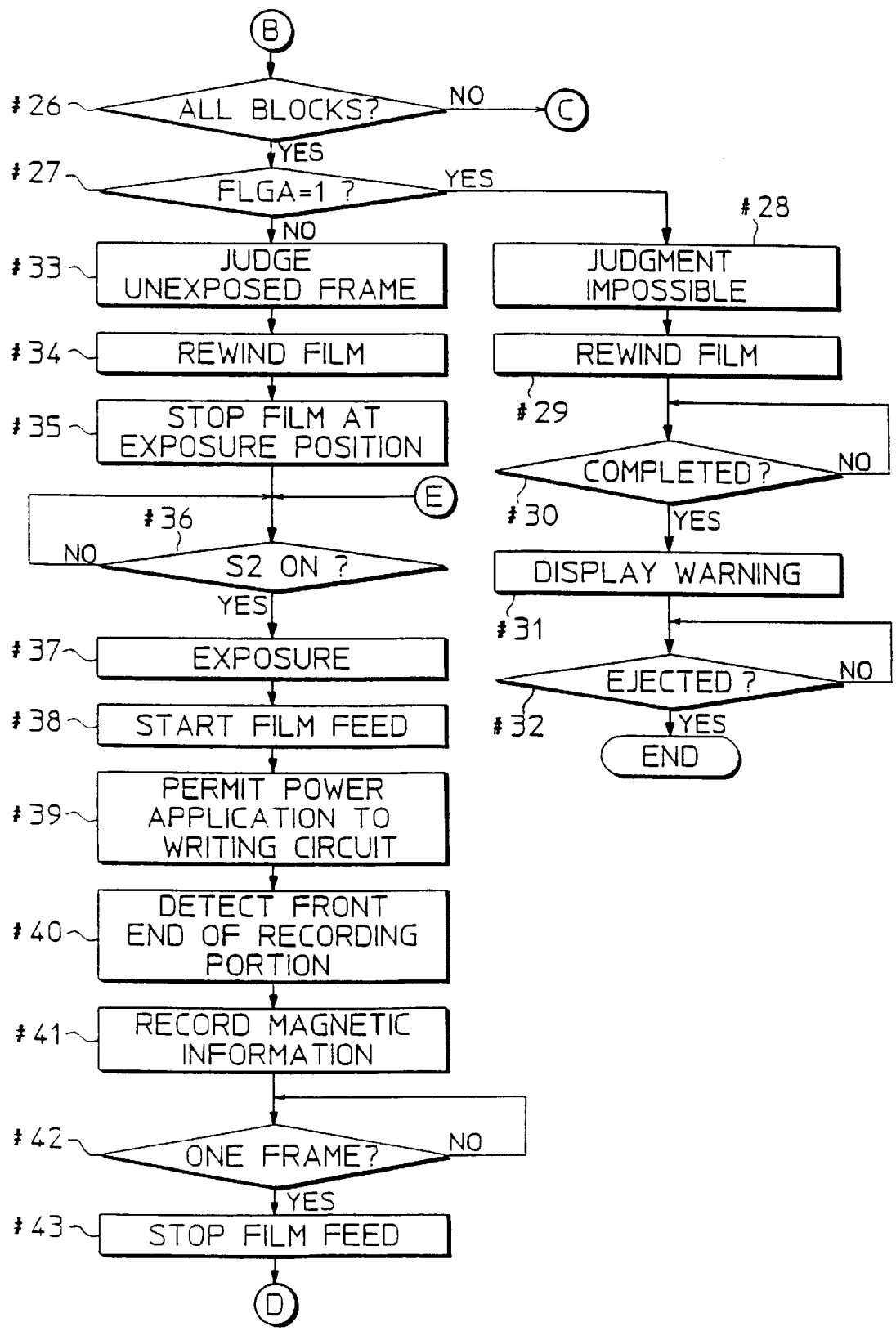
Figure 13:
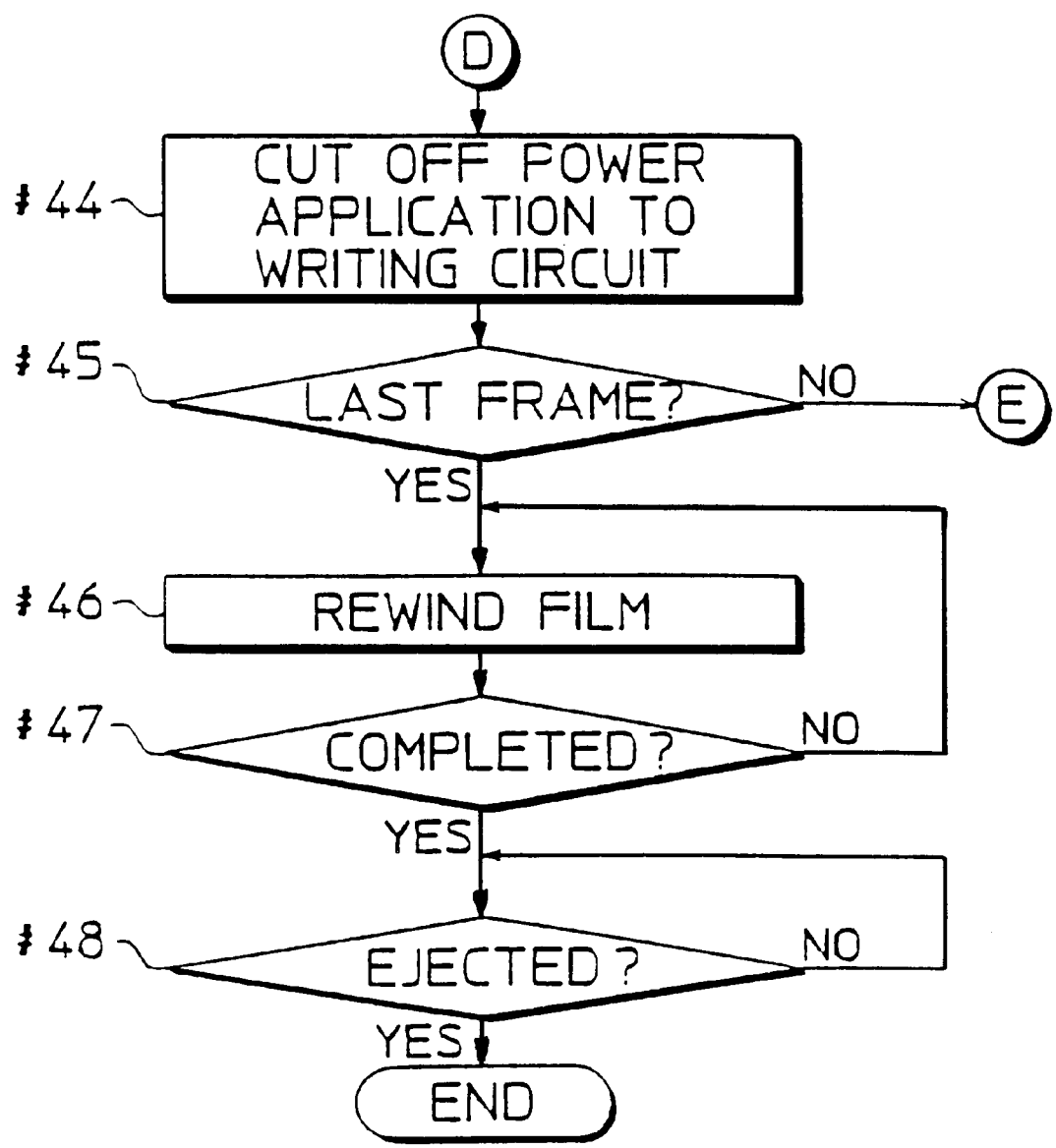

The rectification integral value of the detection signal is used for the following reason. According to a method for comparing the levels of the detection signal, the detection signal of the Ix-signal may be erroneously be judged to be a noise in the case that the level of the detection signal of the Ix-signal is substantially as low as a noise level as shown in FIGS. 8 and 9. However, if the rectification integral value is used, the level of the detection signal of the Ix-signal is considerably higher than that of the detection signal of the noise. Accordingly, an error judgment can securely be prevented.

FIG. 8 is a waveform chart showing an exemplary detection signal of noise, and FIG. 9 is a waveform chart showing an exemplary detection signal in the case that the Ix-signal having a low level is detected. Since a fluctuating cycle is higher than a noise even if the maximum level of the detection signal of the Ix-signal is approximately equal to the noise level, the detection signal of the Ix-signal is higher than that of the noise after the rectification integration.

The integral values of the plurality of blocks are averaged to prevent the noise level K from abnormally increasing when an unexpected external noise accidentally enters. In this embodiment, particularly in order to prevent a level abnormality caused by an unexpected external noise resulting from a commercial frequency (60 Hz/50 Hz), the integral values of five blocks are averaged to obtain an average value over a duration of at least 20 ms or longer.

For the similar reason, the integral value of the plurality of blocks except the maximum and minimum values may be averaged; the maximum and minimum integral values may be averaged; or a median may be used as an average value.

The threshold level setting portion 201D is adapted to set the threshold data $V_{HL}$ ($=a1\times K$), $V_{HH}$ ($=a2\times K$) by multiplying the noise level K by specified coefficients a1, a2, respectively. The lower the level of the signal $S_P$ detected in the magnetic recording portion Fc may be, the more difficult it is to judge whether the detection signal represents the noise or the Ix-signal. In order to make an accurate judgment even in such a case, two kinds of threshold data $V_{HL}$, $V_{HH}$ are set. The coefficients a1, a2 are empirically set in view of the characteristics of the magnetic head 4, the level of the external noise, and other factors. In this embodiment, a1=1.75 and a2=2.5.

The block length setting portion 202 is adapted to divide the magnetic recording portion Fc into a plurality of blocks. The setting portion 202 has a built-in reference clock; generates the sampling clock SCK in accordance with the reference clock and outputs it to the A/D converter 19; and sets a block length, i.e. a detection time T of the detection signal $S_P$ in accordance with the sampling clock SCK. In this embodiment, the detection time T for one block is set at 4 ms, and the detection signal SP is A/D converted every 40 μs so that 100 digital data V(0) to V(99) are read for each block.

The magnetic signal detector 203 generates a data used to compare the threshold data $V_{HL}$, $V_{HH}$ based on the signal $S_P$ detected by scanning the magnetic recording portion Fc by the magnetic head 4. This data is also generated block by block and output to the unexposed frame judger 204.

The magnetic signal detector 203 includes, as shown in FIG. 6, an average value calculator 203A, a rectification integrator 203B, a signal level calculator 203C and a memory 203E. The average value calculator 203A, the rectification integrator 203B and the memory 203E function in the corresponding manner as the average value calculator 201A, the rectification integrator 201B and the memory 201E of the threshold level calculator 201. More specifically, the memory 203E is adapted to store the digital signal $S_P$ (signal obtained by scanning the magnetic recording portion Fc) input from the A/D converter 19 for each block length. The average value calculator 203A calculates an average level $V_{SAVE}$ of the digital signal $S_P$ for each block. The rectification integrator 203B applies a full wave rectification to the digital signal $S_P$ on the basis of the average level $V_{SAVE}$ and integrates this rectification signal.

The unexposed frame judger 204 classifies the signal levels of the respective blocks into three levels ($S_S \leq V_{HL}$, $V_{HL} < S_S$, $V_{HH} < S_S$) by comparing each integral value $S_S$ based on the signal $S_P$ obtained by scanning the magnetic recording portion Fc for each block with the threshold data $V_{HL}$, $V_{HH}$, and judges based on this classification results whether the frame Fa corresponding to this magnetic recording portion Fc is an unexposed frame or an exposed frame or cannot be judged. In this embodiment, if there are three or more consecutive blocks of $V_{HH} < S_S$, the frame Fa is judged to be an exposed frame. If there are three or more consecutive blocks of $V_{HL} < S_S$ although there are no three consecutive blocks of $V_{HL} < S_S$, no judgment is possible for the frame Fa. Unless otherwise, the frame Fa is judged to be an unexposed frame.

The number of the consecutive blocks is set at three or more for the following reason. For example, concerning a noise resulting from a vertical synchronization signal of a television, a noise resulting from a vertical synchronization signal of one cycle is normally frequently counted for the integral value $S_S$. With such an unexpected noise having a relatively high level, it is considered that two consecutive blocks of $V_{HH} < S_S$ may exist, but that three or more of such consecutive blocks are highly unlikely to exist. It should be noted that the number of consecutive blocks is not limited to three, but may be four or more.

Next, the film frame judgment and the film photographing information write control are specifically described with reference to a flowchart shown in FIGS. 10 to 13.

The frame judgment is made during the film loading performed when the film cartridge 30 is loaded in the film chamber in order to feed the film F until the first unexposed frame reaches the specified image recording position, that is, the exposure aperture 51, in the case that a partly exposed film is loaded. Further, the film photographing information is written while the film F is fed by one frame after an exposure is made to the frame. The flowchart shown in FIGS. 10 to 13 is a control sequence of the film loading including the frame judgment and the photographing following thereafter.

Concerning the film loading, when the film cartridge 30 is loaded in the film chamber, the torque transmission mechanism 10 is set in the thrust mode for the film loading, and the film F is thrusted out of the film cartridge 30 by rotating the fork 12 by the torque of the motor 6 (Step #1). The control signal $S_C$ of low level is then output to the magnetic signal writing circuit 5A and power application to the magnetic signal writing circuit 5A is cut off (Step #2). Subsequently, when the leading end of the thrusted out film F is detected by the PI 3 (YES in Step #3), a count value m of a counter for counting the number of blocks is set to "0" (Step #4), and the signal $S_{P'}$ detected by the read coil 4B of the magnetic head 4 is read for five block lengths (read time 5 T=20 ms) (a loop of Steps #5 to #9). During the read time 5 T, the detection signal $S_{P'}$ is the detection signal of noise since the film F has not yet reached the magnetic head 4.

The detection signal $S_{P'}$ is then A/D converted into digital data $V_N(i)$ in sampling cycle ts=40 µs by the A/D converter 19 and is stored in the memory 201E per block length (one block length T, the number of data i=0 to 99). The detection signal $S_{P'}$ is also converted into a rectification integral value $S_N(m)(m=0$ to 4$)$ by the average calculator 201B and the rectification integrator 201B (Steps #5 to #7).

Figure 14:
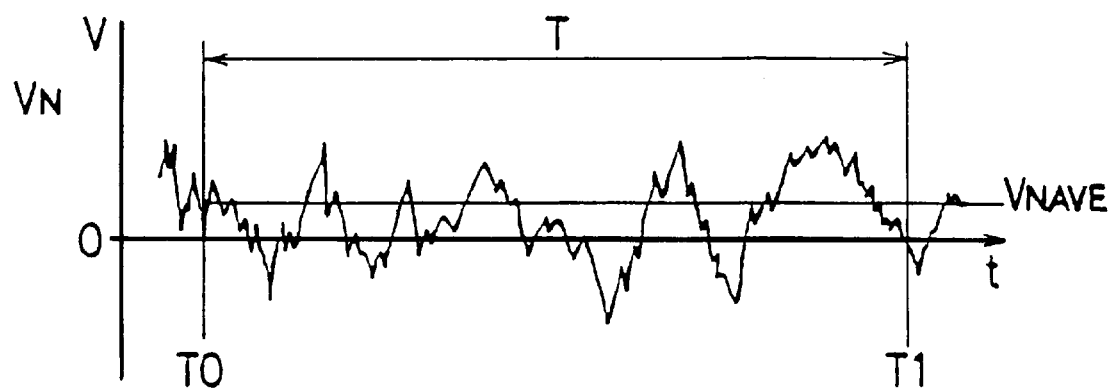
FIG. 14 is a waveform chart showing an average value calculation over one block length of a detection signal of noise.
Figure 15:
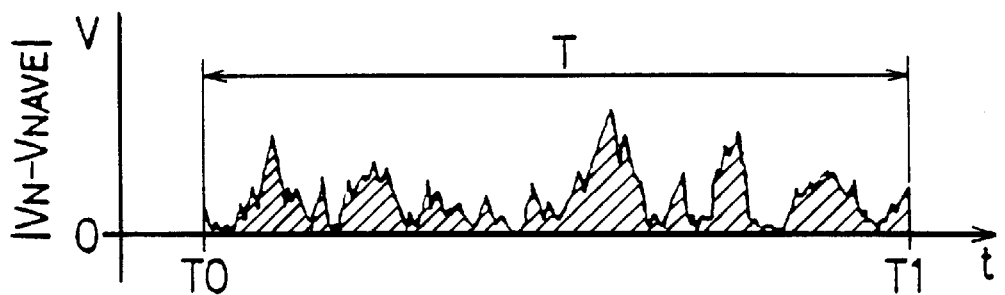
FIG. 15 is a waveform chart showing a rectification integration over one block length of the detection signal of noise.

The rectification integral value $S_N(m)$ of each block is calculated as follows. The average level $V_{NAVE}(m)(=\Sigma V_N(i)/100$, i=0 to 99, m=0 to 4) for each block length T of the detection signal $S_{P'}$ is calculated as shown in FIG. 14 (Step #6). Further, as shown in FIG. 15, after a full wave rectification is applied to the detection signal $S_{P'}$ using the average level $V_{NAVE}$ as a reference level, the signal level is integrated (corresponding to a hatched area of FIG. 15) to obtain the rectification integral value $S_N(m)$ of the block. The above rectification integration is performed by calculating absolute values of differences $|V_N(i)-V_{NAVE}(m)|$ between the data $V_N(i)$ read from the memory 201E and the average level $V_{NAVE}(m)$ by the rectification integrator 201B and adding these absolute values ($\Sigma |V_N(i)-V_{NAVE}(m)|$, i=0 to 99, m=0 to 4).

Figure 16:
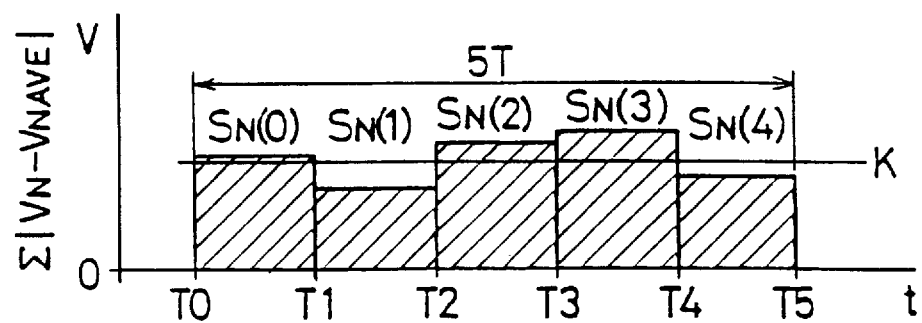
FIG. 16 is a graph showing a noise level calculation for the frame judgment.

When the calculation of the rectification integral values $S_N(0)$ to $S_N(4)$ of five blocks is completed (YES in Step #9), the noise level calculator 201C calculates an average value K of these rectification integral values ($\Sigma S_N(m)/5$, m =0 to 4) as a noise level as shown in FIG. 16 (Step #10), and the threshold level setting portion 201D sets the threshold values $V_{HL}$, $V_{HH}$ by multiplying the average value K by the coefficients a1, a2, respectively (Step #11). FIG. 16 is a bar graph showing the rectification integral values $S_N(0)$ to $S_N(4)$ corresponding to periods T0 to T1, T1 to T2, . . . , T4 to T5, and the level K is an average value of the rectification integral values $S_N(0)$ to $S_N(4)$.

Subsequently, when the front end position of the magnetic recording portion Fc (the front end position of the magnetic track) corresponding to the leading frame of the frame Fa is detected after the film F is fed by a specified distance (distance d) in accordance with the detection signal of the perforation Fb by the PI 2 (Step #12), a count value X of a counter for counting the number of consecutive blocks having a level in excess of the threshold level $V_{HH}$ and a count value Y of a counter for counting the number of consecutive blocks having a level in excess of the threshold level $V_{HL}$ in the signal $S_P$ detected by scanning the magnetic recording portion Fc by the magnetic head 4 are both set to "0", and a flag FLGA representing that the frame judgment is impossible is reset to "0" (Step #13).

Subsequently, the signal $S_P$ detected via the read coil 4B of the magnetic head 4 and the magnetic signal reading circuit 5B are stored in the memory 203E after being A/D converted for each block length (one block length T, number of data i=0 to 99) by the A/D converter 19 (Step #14). Then, the rectification integral values $S_S$ of the respective blocks are calculated by the calculation similar to the one for the detection signal $S_{P'}$ of noise (Steps #15, #16).

More specifically, the average level $V_{SAVE}$ ($=\Sigma V_S(i)/100$, i=0 to 99) is calculated by the average value calculator 203A (Step #15). Further, the rectification integrator 203B reads the respective data $S_S(i)$ from the memory 203E, and calculates the rectification integral value $S_S$ by adding the absolute values of differences $|V_S(i)-V_{SAVE}|$ between the data $V_S(i)$ read from the memory 203E and the average level $V_{SAVE}$ (Step #16).

Subsequently, the unexposed frame judger 204 compares the rectification integral value $S_S$ with the threshold levels $V_{HH}$ (Step #17) and $V_{HL}$ (Step #20) to classify in which ranges of $S_S \leq V_{HL}$, $V_{HL} < S_S$, $V_{HH} < S_S$ the rectification integral value $S_S$ of that block falls. Depending on the classification results, the count value X of the consecutive blocks of $V_{HH} < S_S$ is changed (Step #18 or #19) or reset to "0" (Step #19), and the count value Y of the consecutive blocks of $V_{HL} < S_S$ is changed (Step #21 or #22). More specifically, if $V_{HH} < S_S$ (YES in Step #17), the count value X is incremented by "1" (Step #18). If $S_S \leq V_{HH}$ (NO in Step #17), the count value X is reset to "0" (Step #19). Further, if $V_{HL} < S_S$ (YES in Step #20), the count value Y is incremented by "1" (Step #21). If $S_S \leq V_{HL}$ (NO in Step #20), the count value Y is reset to "0" (Step #22).

It is then judged whether the count value X has reached "3", i.e. there have been three consecutive blocks having a level in excess of the threshold level $V_{HH}$ (Step #23). If X=3

(YES in Step #23), Step #12 follows upon the judgment that the frame corresponding to this magnetic recording portion Fc is an exposed frame, and the same frame judgment as above is made for the next frame (Steps #12 to #23).

On the other hand, unless X=3 (NO in Step #23), it is judged whether the count value Y has reached "3", i.e. there have been three consecutive blocks having a level in excess of the threshold level $V_{HL}$ although there have been no three consecutive blocks having a level in excess of $V_{HH}$ (Step #24). If Y=3 (YES in Step #24), Step #26 follows after the flag FLGA is set to "1" (Step #25). Unless Y=3 (NO in Step #24), Step #26 directly follows.

Figure 17:
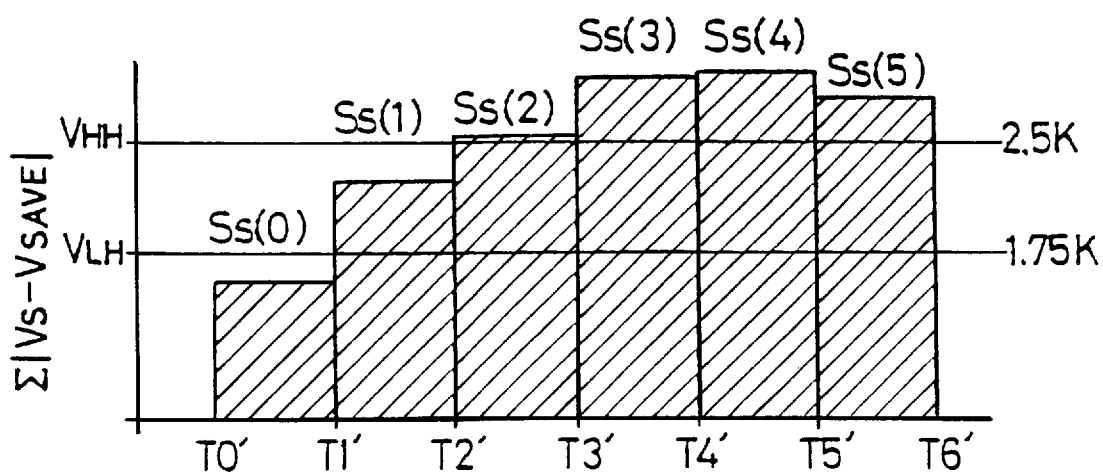
FIG. 17 is a graph showing an exemplary variation of the rectification integral value of a detection signal calculated by the block.
Figure 18:
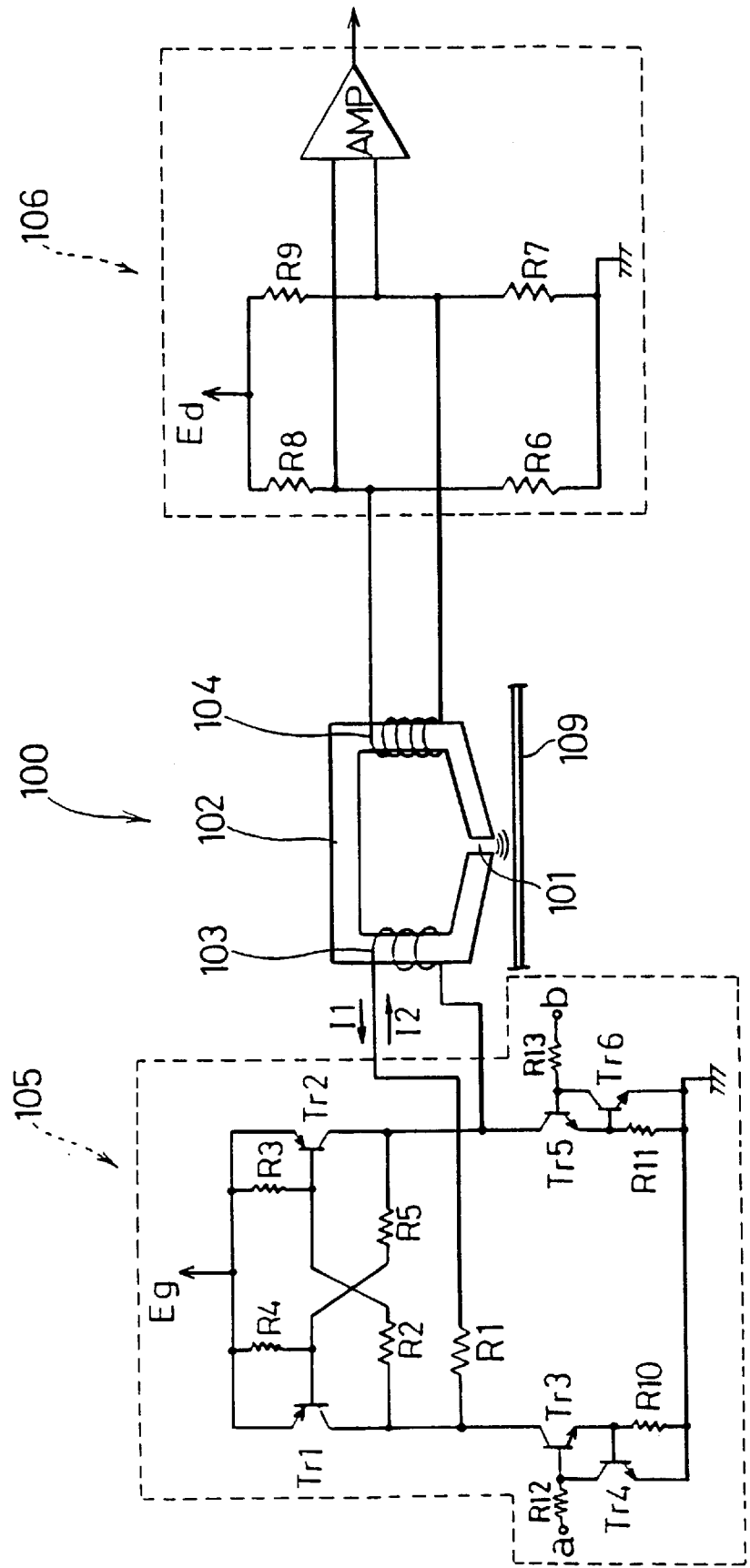
FIG. 18 is a circuit construction diagram of writing and reading portions arranged in the vicinity of a magnetic head in a prior art magnetic recording and reproducing device.

FIG. 17 is a graph showing an exemplary variation of the rectification integral values $S_S$ of the detection signal $S_P$ calculated block by block. Specifically, FIG. 17 is a bar graph showing the rectification integral values $S_S(0)$, $S_S(1)$, $S_S(2)$, ... $S_S(5)$ corresponding to periods T0' to T1', T1' to T2', ... T5' to T6'. In this example, since the rectification integral values $S_S(3)$ to $S_S(5)$ of the signals $S_P$ continuously read by scanning the magnetic recording portion Fc are consecutively in excess of the threshold level $V_{HH}$, the frame Fa corresponding to this magnetic recording portion Fc is judged to be an exposed frame. On the other hand, if the rectification integral value $S_S(3)$ is: $V_{HL} \leq S_S(3) < V_{HH}$, no three consecutive rectification integral values are in excess of the threshold level $V_{HH}$, but three or more consecutive rectification integral values are in excess of the threshold level $V_{HL}$ ($S_S(1)$ to $S_S(3)$), no frame judgment is judged to be possible. If there are only two consecutive blocks having a level in excess of the threshold value $V_{HL}$, the frame corresponding to this magnetic recording portion Fc is judged to be an unexposed frame upon the judgment that the Ix-signal is not recorded therein.

Referring back to FIG. 12, it is judged whether the frame judgment has been made for all blocks of the magnetic recording portion Fc (Step #26). If the frame judgment has not yet been made for all blocks of the magnetic recording portion Fc (NO in Step #26), this routine returns to Step #14 and the classification of the rectification integral value and the frame judgment are performed for the next block (Steps #14 to #26).

Upon the completion of the frame judgment for all blocks of the magnetic recording portion Fc (YES in Step #26), it is judged whether the flag FLGA is set at "1" (Step #27). If the flag FLGA is set at "1" (YES in Step #27), the frame judgment is judged to be impossible (Step #28). Then, the drive mode for the torque transmission mechanism 10 is set to the film rewind mode (Step #29) and the film F is rewound by rotating the fork 12 in the reverse direction by the torque of the motor 6 (Step #30). Upon the completion of the rewinding (YES in Step #30), a warning "Frame Judgment Impossible" is displayed in a display device provided on the camera main body (Step #31). When the film cartridge 30 is ejected (YES in Step #32), the film loading and the frame judgment are completed.

On the other hand, unless the flag FLGA is set at "1" (NO in Step #27), the frame Fa corresponding to the magnetic recording portion Fc is judged to be an unexposed frame (Step #33) and the film F is rewound by one frame to position the exposure area of the frame Fa with respect to the exposure aperture 51. Specifically, the drive mode for the torque transmission mechanism 10 is set to the film rewind mode, and the film F is rewound by rotating the fork 12 in the reverse direction by the torque of the motor 6 until the perforation Fb representing the front end position of this frame Fa is detected by the PI 2 (Steps #34, #35). Consequently, the film loading and the frame judgment are completed.

Subsequently, when the photographing is performed by pressing an unillustrated release switch S2 (YES in Step #36), an image is recorded in the leading unexposed frame in the image recording position (Step #37). Thereafter, the drive mode for the torque transmission mechanism 10 is set to the film wind mode to start the feed of the film F by one frame by driving the motor 6 (Step #38). Simultaneously, the control signal $S_C$ of high level is output to the magnetic signal writing circuit 5A, and power application to the circuit 5A is permitted (Step #39). This is because the film photographing information corresponding to the frame Fa to which an exposure was made is written while the film F is fed by one frame.

Subsequently, when the front end position of the magnetic recording portion Fc is detected by feeding the film F by a specified amount (Step #40), the write data is output from the write data generator 18 to the magnetic signal writing circuit 5A, and the film photographing information is recorded in this magnetic recording portion Fc (Step #41). When the perforation Fb representing the front end position of the next frame Fa is detected by the PI 2 (YES in Step #42), the motor 6 is stopped to stop the feed of the film F (Step #43). Then, power application to the magnetic signal writing circuit 5A is interrupted (Step #44) and it is judged whether an exposure has been made to the last frame (Step #45). Unless an exposure has been made to the last frame (NO in Step #45), Step #36 follows and the film photographing information is recorded in the magnetic recording portion Fc every time an exposure is made to the frame by repeating the above operations (a loop of Steps #36 to #45).

When all frames are exposed (YES in Step #45), the drive mode for the torque transmission mechanism 10 is set to the film rewind mode and the film F is rewound by rotating the fork 12 in the reverse direction by the torque of the motor 6 (Steps #46, #47). Upon the completion of the rewinding (YES in Step #47), the recording of the film photographing information in association with the photographing operation is completed by ejecting the film cartridge 30 (YES in Step #48).

Although the film frame judging device is described in the foregoing embodiment, the present invention is not limited to such a device, but is applicable to a magnetic recording and reproducing circuit of a film image reproducing apparatus for reproducing images recorded in frames of a film having, e.g. the above magnetic recording portions on a display device such as a CRT by writing and reading an information in and from a magnetic recording medium using a magnetic head of core share type, or magnetic recording and reproducing devices of another kinds.

As described above, in the magnetic recording and reproducing device which includes the magnetic head in which the write coil and the read coil are wound around the single core and which is capable of magnetically writing and reading an information in and from the magnetic recording medium, a supply of a dc current to the write coil is cut off during the writing of the information so that no current flows in this write coil. Accordingly, a leakage current does not flow in the write coil, thereby preventing the quality degradation of the detection signal due to a noise resulting from a mutual induction action. Further, since no unnecessary current is supplied to the write coil, a current consumption can also be reduced.

Further, the magnetic recording and reproducing device detects the magnetic signal representing the information concerning the exposure made to the frame which signal is magnetically recorded so as to correspond to the frame of the film, and judges based on this magnetic signal whether an exposure can be made to this frame. Accordingly, a likelihood of an error frame judgment due to a noise resulting from a mutual induction action is reduced, thereby improving a judgment accuracy.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An apparatus comprising:
   a magnetic head including a core, a writing coil wound around the core, and a reading coil wound around the same core;
   a writing circuit connected with the writing coil for driving the writing coil;
   a reading circuit connected with the reading coil for generating a read signal based on an output of the reading coil;
   a power source for supplying an electric power to the writing circuit; and
   a controller for suspending the supply of electric power to the writing circuit when the reading circuit is in operation so as to prevent a mutual induction occurring through the same core around which the coils are wound.

2. An apparatus according to claim 1, wherein the writing circuit and the reading circuit are adapted for writing and reading information on a magnetic recording portion provided on a photographic film.

3. An apparatus according to claim 2 which is a camera.

4. An apparatus according to claim 3, further comprising a judger for judging based on a read signal of the reading circuit whether the magnetic recording portion has been written with information.

5. An apparatus according to claim 2, further comprising a judger for judging based on a read signal of the reading circuit whether the magnetic recording portion has been written with information.

6. An apparatus comprising:
   a magnetic head including a core, a writing coil wound around the core, and a reading coil wound around the same core;
   a writing circuit connected with the writing coil for driving the writing coil;
   a reading circuit connected with the reading coil for generating a read signal based on an output of the reading coil; and
   a controller for disabling the writing circuit when the reading circuit is in operation so as to prevent a mutual induction occurring through the same core around which the coils are wound.

7. An apparatus according to claim 6, wherein the writing circuit and the reading circuit are adapted for writing and reading information on a magnetic recording portion provided on a photographic film.

8. An apparatus according to claim 7 which is a camera.

9. An apparatus according to claim 8, further comprising a judger for judging based on a read signal of the reading circuit whether the magnetic recording portion has been written with information.

10. An apparatus according to claim 7, further comprising a judger for judging based on a read signal of the reading circuit whether the magnetic recording portion has been written with information.

11. A method for writing and reading information on a magnetic recording medium by use of a magnetic head including a core, a writing coil and a reading coil wound around the same core, the method comprising steps of:
    feeding the magnetic recording medium;
    suspending supply of electric power to the writing coil;
    generating a read signal based on an output of the reading coil; and
    permitting supply of electric power to the writing coil in a manner so as to prevent a mutual induction occurring through the same core around which the coils are wound.

12. A method according to claim 11, further comprising a step of permitting the writing coil to write information on the magnetic recording medium after permitting supply of electric power to the writing coil.

13. A method for writing and reading information on a magnetic recording portion of a photographic film by use of a magnetic head including a core, a writing coil and a reading coil wound around the same core, the method comprising steps of:
    feeding the photographic film;
    suspending supply of electric power to the writing coil;
    generating a read signal based on an output of the reading coil; and permitting supply of electric power of the writing coil in a manner so as to prevent a mutual induction occurring through the same core around which the coils are wound.

14. A method according to claim 13, further comprising a step of judging based on a read signal whether the magnetic recording portion has been written with information.

15. A method according to claim 14, further comprising a step of stopping the feeding of the photographic film when the magnetic recording portion is judged to have been written with no information.

16. A method according to claim 15, further comprising a step of permitting the writing coil to write information on the magnetic recording portion after the photographic film is stopped.

* * * * *